(12) United States Patent
Flynn et al.

(10) Patent No.: US 6,567,918 B1
(45) Date of Patent: May 20, 2003

(54) SAVED WEB PAGE SECURITY SYSTEM AND METHOD

(75) Inventors: Sean L. Flynn, North Bend, WA (US); Loren M. Kohnfelder, Bellevue, WA (US); Eric J. Hennings, Seattle, WA (US); Ray Sun, Redmond, WA (US); Michael J. Wallent, Redmond, WA (US); Eric R. Berman, Woodinville, WA (US); Sanjay G. Shenoy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/239,132

(22) Filed: Jan. 28, 1999

(51) Int. Cl.$^7$ ................................................. G06F 11/30
(52) U.S. Cl. ...................................................... 713/200
(58) Field of Search ................................ 713/200, 201, 713/202

(56) References Cited

U.S. PATENT DOCUMENTS

| | | | | |
|---|---|---|---|---|
| 5,678,041 A | * | 10/1997 | Baker et al. ................. | 395/609 |
| 5,706,507 A | * | 1/1998 | Schloss ....................... | 395/615 |
| 5,848,412 A | * | 12/1998 | Rowland et al. ............. | 707/9 |
| 5,911,043 A | * | 6/1999 | Duffy et al. ............ | 395/200.23 |
| 6,029,245 A | * | 2/2000 | Scanlan ...................... | 713/200 |
| 6,085,224 A | * | 7/2000 | Wagner ....................... | 703/203 |
| 6,141,694 A | * | 10/2000 | Gardner ....................... | 709/240 |
| 6,286,001 B1 | * | 9/2001 | Walker et al. ................ | 707/9 |
| 6,304,894 B1 | * | 10/2001 | Nakayama et al. ......... | 709/203 |
| 2002/0095415 A1 | * | 7/2002 | Walker et al. ................ | 707/9 |

* cited by examiner

Primary Examiner—Norman Wright
(74) Attorney, Agent, or Firm—Banner & Witcoff, Ltd.

(57) ABSTRACT

A system and method of saving a Web page from a Web site on an Internet to a computer-readable medium is disclosed. A Web page is downloaded from the Internet to the computer-readable medium. The Internet address for the Web page is stored on the computer-readable medium. When the Web page is opened from the computer-readable medium, the Internet address is used to identify a security context for the Web page. By using the Internet address to identify the security context for the Web page, the system and method of the present invention allows users to securely view and execute Web pages downloaded from the Internet.

16 Claims, 3 Drawing Sheets

SAVED WEB PAGE SECURITY SYSTEM AND METHOD

FIELD OF THE INVENTION

The present invention relates to the field of network browsing software and, in particular, to methods and systems for secure viewing and execution of Web pages saved (i.e. downloaded) from the Internet.

BACKGROUND OF THE INVENTION

In recent years, there has been a tremendous proliferation of computers connected to a global network known as the Internet. A "client" computer connected to the Internet can download digital information from "server" computers connected to the Internet. Client application and operating system software executing on client computers typically accepts commands from a user and obtains data and services by sending requests to server applications running on server computers connected to the Internet. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and other protocols.

The HTTP protocol is used to access data on the World Wide Web, often referred to as "the Web." The World Wide Web is an information service on the Internet providing documents and links between documents. The World Wide Web is made up of numerous Web sites around the world that maintain and distribute Web documents. A Web site may use one or more Web server computers that are able to store and distribute documents in one of a number of formats including the Hyper Text Markup Language (HTML). An HTML document can contain text, graphics, audio clips, and video clips, as well as metadata or commands providing formatting information. HTML documents also include embedded "links" that reference other data or documents located on the local computer or network server computers.

A Web browser is a client application, software component, or operating system utility that communicates with server computers via FTP, HTTP, and Gopher protocols. Web browsers receive Web documents from the network and present them to a user. Internet Explorer, available from Microsoft Corporation, of Redmond, Wash., is an example of a popular Web browser.

An intranet is a local area network containing Web servers and client computers operating in a manner similar to the World Wide Web described above. Additionally, on an intranet a Web browser can retrieve files from a file system server executing on the same computer as the Web browser, or on a remote computer on the local area network. A Web browser can retrieve files on the local area network using the "FILE" protocol, which comprises file system commands. Typically, all of the computers on an Intranet are contained within a company or organization. Many intranets include a "firewall" that functions as a gateway between the intranet and the Internet, and prevents unauthorized people from breaking into the computers of an organization. A "proxy server" is one well-known type of firewall.

In addition to data and metadata, HTML documents can contain embedded software components containing program code that perform a wide variety of operations. As used herein, the term software components refers to binary objects or programs that perform specific functions and are designed in such a way to easily operate with other components and applications. These software components expand the interactive ability of an HTML document's user interface. The components can perform other operations, such as manipulating data and playing audio or video clips. Example software components are ActiveX®, Java, JavaScript, and VBScript; however, other embedded software components can and do exist. ActiveX® is a specification developed by Microsoft Corporation for creating software components that can be embedded into an HTML document. Java is a well-known programming language that can be used to develop components called "applets," which are transmitted with HTML documents from Web servers to client computers. JavaScript and VBScript are scripting languages that are also used to extend the capabilities of HTML. JavaScript and VBScript scripts are embedded in HTML documents. A browser executes each script and/or software component as it reaches the position in the script during interpretation of the HTML document.

Some Web pages on the Internet contain software components that perform operations that are not desired by a user. This may occur either because a component developer intentionally programmed the component to perform a malicious operation, or because a "bug" in the software causes the component to perform an unintended or malicious operation. One way in which browsers have addressed the problem of undesirable operations being performed is by use of security zones. Security zones are similar to visas that some countries issue to travelers. If the country trusts you, they stamp your passport so you can travel anywhere you like during your visit. If for some reason the country does not completely trust you, it strictly limits where you can go and what you can do during your stay.

Security Zones work the same way as visas, except that the user is in the role of the country deciding how much access to allow to visitors to the user's computer. Web sites that the user trusts—such as those on the user's intranet or from established companies in whom the user has confidence—can be designated as trusted, allowing them to run as much powerful, active content on the user's computer as desired. Sites that the user is not as sure about, can be assigned a different zone classification from which the user can strictly limit access to the user's computer.

Version 4.0 of Microsoft Corporation's Internet Explorer is an example of a commercially available program that includes the concept of security zones. Under this concept, each Web page belongs to exactly one security zone, and each zone defines a set of permissions for Web pages that reside in that zone. For example, these permissions control whether to run JavaScript and VBScript scripts contained in the Web page. In addition, these permissions enable or disable downloaded software in the form of Java or ActiveX® controls. Zone classification is based on the Web page's uniform resource locator (URL). Thus, each security zone grants a separate set of permissions to Web pages located in the security zone.

Additional security restrictions are imposed by the Web browser to constrain interaction of Web pages that are joined together to form HTML framesets. An HTML frameset consists of a collection of frames that allow creation of multiple document windows within one browser. Each frame appears to act like a separate browser window, displaying multiple information sources simultaneously. Within each frame a user can scroll up and down, and perform all the things that a user would normally do within a single browser window. Frames allow HTML programmers to create complex documents that present information in a useful manner. The links in a frame can control what is displayed in other frames or windows. This enables programmers to create indices or quick tabs that allow easier navigation through a single document or groups of documents. For example, selecting a link in the index frame could cause a different page to appear within another frame. As used herein, the term "domain" means a group of computers and devices on a network that are administered as a unit with common rules and procedures. Within the Internet, domains are defined by their IP address. All devices sharing a common part of the IP address are said to be in the same domain. In Version 4.0 of Microsoft's Internet Explorer, pages of an HTML frameset may only interact if the domain components of their URLs refer to the same domain. Thus, the security mechanisms of Internet Explorer apply equally to both zones and cross-domain access (i.e. cross-frame or frameset interactions), because both are based on URLs; however, the specific benefits are separate—correct permissions granted in zones and correct range of access allowed for domains.

However, a security risk may be created when a user saves (i.e. downloads) a Web page from the World Wide Web to his or her local hard drive or other local storage media. More particularly, the saved Web page is stored on the user's hard drive and is thus in the user's local machine zone, which is typically granted low security. Accordingly, the saved Web page enjoys the most liberal set of permissions granted by the security zone system. This exposes the user to a security risk when he or she loads the Web page back into the Web browser from his or her local storage medium. With the enhanced local machine permissions, the Web page and/or HTML framesets contained therein would be capable of running active content scripting such as JavaScript and VBScript, software controls such as Java or ActiveX® controls, and cross-frame scripting in between the HTML framesets, that would have been prohibited in the Web page's original security context.

For example, consider a Web page that, based on its URL, is classified in a High Security Zone. The Web page is classified in this zone because the user does not trust the Web site. Thus, because the Web page is classified in the High Security Zone, the Web browser will not run active content scripts, cross-frame scripts or software controls, that could potentially damage the user's computer. The problem arises if the user saves this Web page to his or her local hard drive, inside the user's firewall, or to any location in a less secure zone. The Web page was previously in a High Security Zone; however, since the URL for the Web page has changed, the Web page is now classified as being located in a Low Security Zone. In other words, the original security zone classification is not preserved. Consequently, the Web browser is free to execute potentially harmful active content scripts, cross-frame scripts and/or software controls the next time the Web page is viewed or executed off of the local hard drive. Indeed, the scripts and/or software controls need not display a user interface or message at the time of execution; consequently, harm could be caused to the user's system without the user even knowing about it.

In addition to the acquisition of new permissions, the content of the Web page would then be able to access content (cross-domain) in the saved domain. Further, another potential problem is that scripts can check for the Web page's current URL (i.e. location) and only execute harmful attack code when the page is executed from a local hard drive, thereby avoiding security warnings that would have been raised if the Web page had been executed in its original Web location in the Internet zone. Thus, saving the Web page to the local hard drive can create potential security risks. In sum, any new URL of a different zone/domain affords new permissions/access to the content.

Although the above security risk may be created when a Web page is saved to a local hard drive or other local storage media, the skilled artisan will understand that this risk is not present during traditional Web page viewing—despite the fact that the content of the Web page was downloaded from the Internet into the cache of the user's computer. Web pages in the cache do not suffer the security zone transition problem because they are accessed through their original URLs, and hence retain their original security zone classification. Thus, the primary problem solved by the present invention is how to retain a file's original security zone classification whenever the file is moved from one security zone to another.

Accordingly, it is an object of the present invention to provide an improved method and security system that allows secure viewing and execution of Web pages downloaded from the Internet.

SUMMARY OF THE INVENTION

The saved web page security system of the present invention includes a computer-readable medium with computer-executable components. One of the computer-executable components is a storage component. The storage component stores information about an electronic document, such as a Web page, when the electronic document is saved to the computer-readable medium. The other computer-executable component is a security component. The security component uses the stored information to facilitate secure viewing or execution of the downloaded electronic document. In an alternate embodiment in which the electronic document crosses zone boundaries, the present invention utilizes the above principals to facilitate secure viewing or execution of the document regardless as to whether the document is downloaded or whether the document is saved to a particular computer-readable medium.

Under the saved web page security method of the present invention, a Web page is downloaded from the Internet to a computer-readable medium. The Internet address for the Web page is stored on the computer-readable medium. When the Web page is opened from the computer-readable medium, the Internet address is used to identify a security context for the Web page.

BRIEF DESCRIPTION OF THE DRAWINGS

The present invention may take physical form in certain parts and steps, preferred embodiments of which will be described in detail in this specification and illustrated in the accompanying drawings which form a part hereof, wherein.

DETAILED DESCRIPTION OF THE INVENTION

Figure 1:
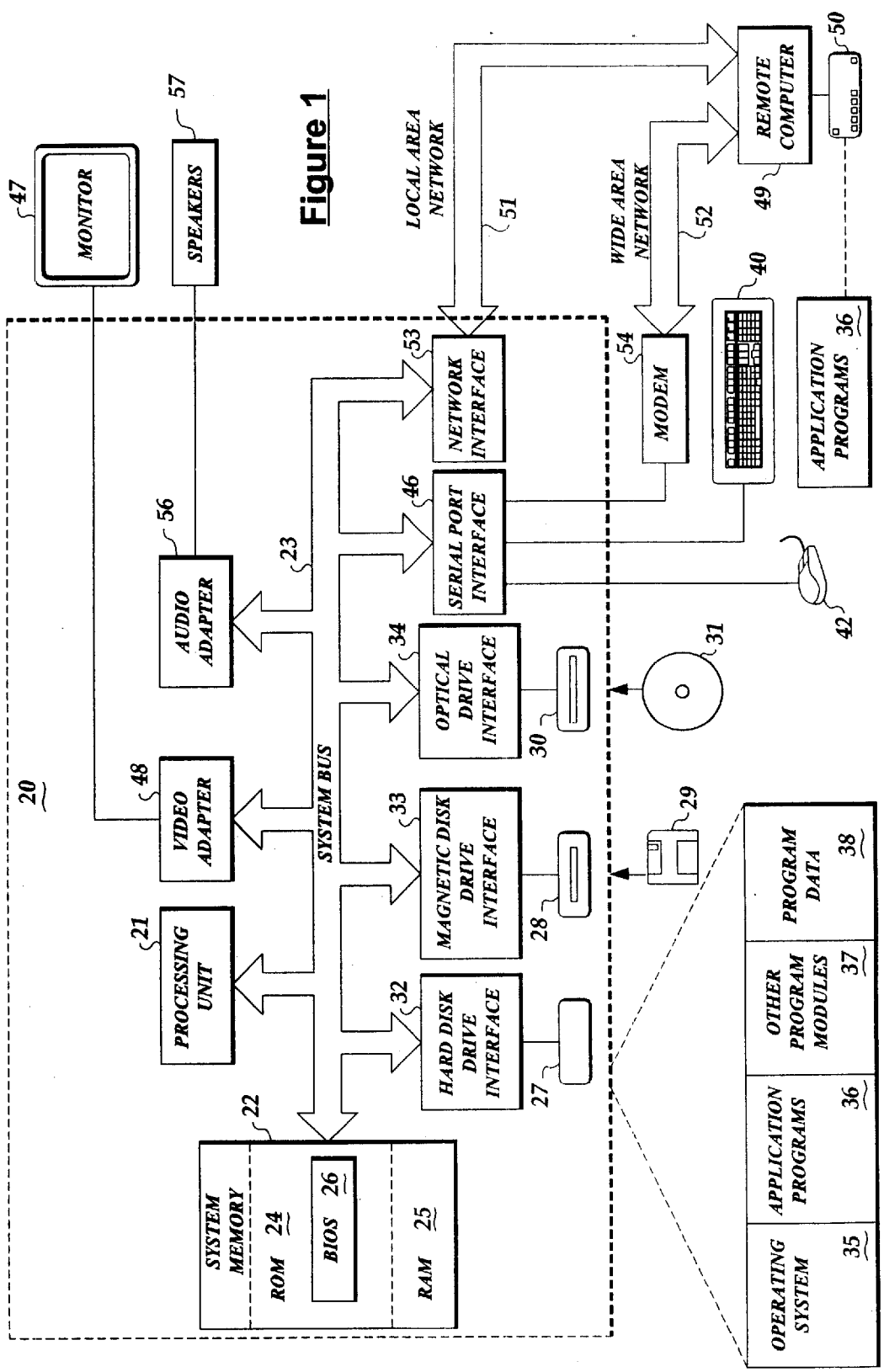
FIG. 1 is a block diagram of a general purpose computer system for implementing the present invention.

The system and method of the present invention allows users to securely view and execute Web pages downloaded from one or more Web sites on the Internet. A Web site is a source of digital data and may correspond to one or more server computers, or to a subset of the data stored at a server computer. A server computer may include multiple Web sites. For example, the data contained within a directory structure stored on a computer may correspond to a Web site. A Web site may be identified by a specification of an Internet domain, an Internet protocol (IP) address, or a directory path. The process of locating and receiving digital data from Web sites is referred to as "browsing."

Typically, "Web browsers" allow users to specify a plurality of security zones. Each zone includes one or more Web sites, each Web site being situated on a corresponding computer network. The configuration includes information specifying a set of security settings corresponding to each zone. A security setting is a specification indicating an action to perform when a Web page from one of the zones requests a protected operation to be performed. During a Web browsing session, the zone corresponding to the Web site currently being browsed is identified. Prior to performing the protected operation, the action to be performed is determined, based on the current Web site's zone, the requested operation, and the security setting corresponding to the requested operation and the Web site's zone. Depending upon the security setting, the Web browser may perform the requested operation, prevent the requested operation from being performed, or prompt the user for a decision as to whether to perform the requested operation. During the browsing of a Web site, the browser visually indicates the zone corresponding to the Web site.

When a user instructs the Web browser to download a Web page from the Internet, the system and method of the present invention stores the saved Web page on a computer-readable medium. In addition, the Web browser stores the Internet address (i.e. URL) for the Web page on the computer-readable medium. When the user subsequently loads the Web page back into the Web browser, the system and method of the present invention uses the stored URL to identify the appropriate security context for the Web page. Depending upon the security context for the saved Web page, the Web browser may perform requested operations, prevent the requested operations from being performed, or prompt the user for a decision as to whether to perform requested operations. Since the present invention saves the URL and not the zone from which the Web page was saved, the present invention honors the security settings of each individual user. Thus, the system and method of the present invention allows users to securely view and execute Web pages downloaded from one or more Web sites on the Internet, even if the downloaded Web pages are subsequently transferred to different users with different security settings.

In accordance with the present invention, a Web browser executes on a computer, such as a general purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as remote computers 49 and 60.

Each remote computer 49 or 60 may be another personal computer, a server, a router, a network PC, a peer device or other common network node, and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
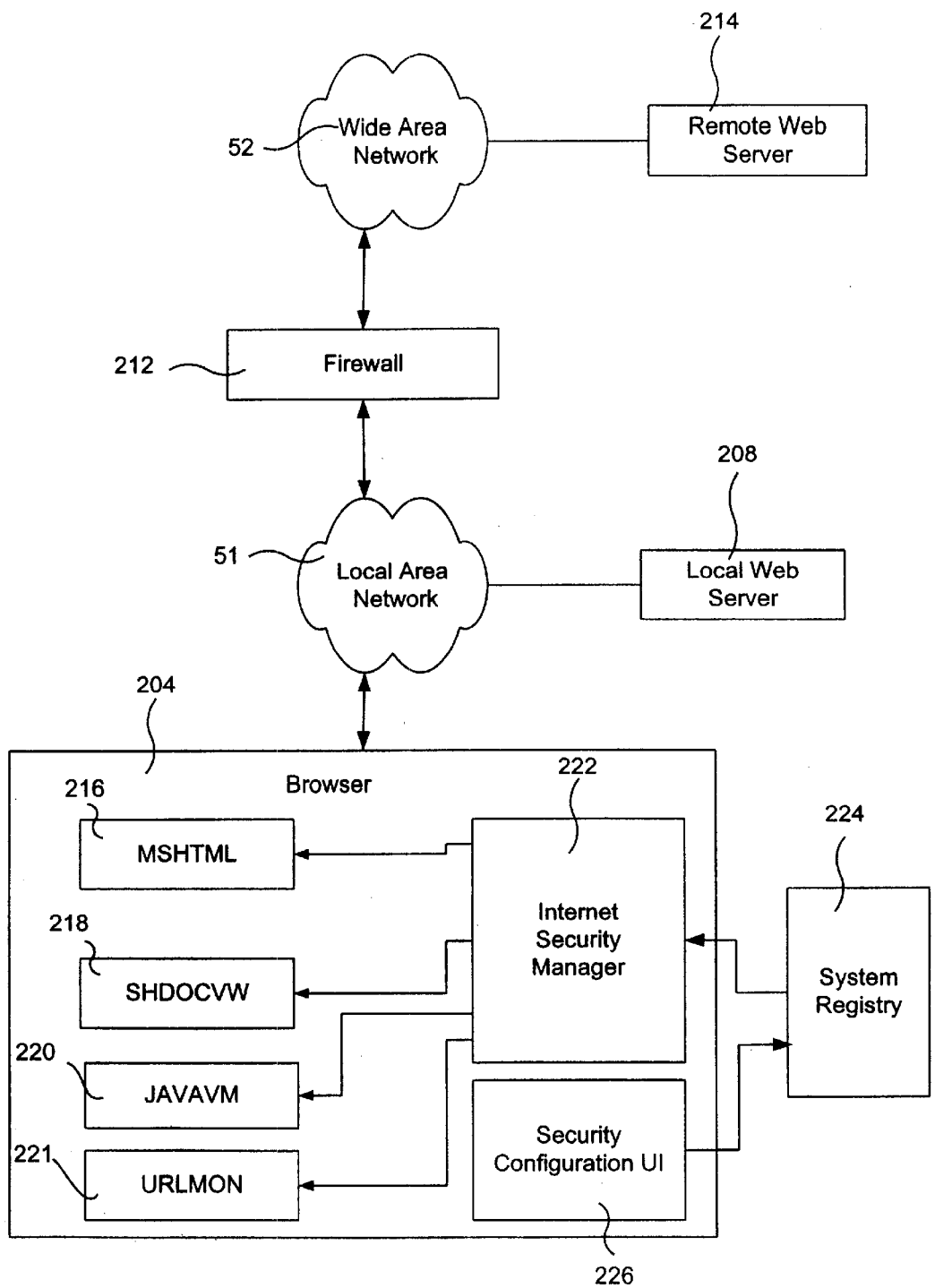
FIG. 2 is a block diagram illustrating an architecture of a Web browser, in accordance with the present invention.

FIG. 2 illustrates an architecture of a Web browser 204 communicating over a local area network 51 and a wide area network 52, such as the Internet. The local area network 51 functions as an intranet, connecting client computers executing Web browsers 204 to one or more local Web server computers 208. The local area network 51 communicates with the wide area network 52 through a firewall 212. The firewall 212 may comprise a computer that physically connects to the LAN 51 and the wide area network 52. Alternatively, the firewall 212 may comprise one or more computer programs executing on a computer connected to the LAN 51 and not intermediate to LAN 51 and the wide area network 52.

A remote Web server 214 communicates over the wide area network 52 to the Web browser 204. The remote Web server 214 may comprise one or more computer programs executing on the remote computer 49 illustrated in FIG. 1.

As should be understood by those skilled in the art of computer systems, and others, the architecture illustrated in FIG. 2 is exemplary, and alternative architectures may be used without departing from the spirit of the invention. For example, the firewall 212 is not required by the invention. Similarly, the invention does not require both the local area network 51 and the local Web server 208. As illustrated in FIG. 1, the client computer executing the Web browser 204 may communicate with the wide area network via a modem 54. Additionally, a Web server may comprise a server program that executes on the same client computer executing the Web browser 204. In such a configuration, communication between a client computer and a server computer refers to communication between programs or software components executing on the same computer.

As depicted in FIG. 2, the Web browser 204 may include four components that perform operations in response to receiving documents from a local Web server 208 or a remote Web server 214 such as, for example: an MSHTML component 216, an SHDOCVW component 218, a JAVAVM component 220, and a URLMON component. The MSHTML component 216 performs operations that control the display of an HTML page. The MSHTML component, in cooperation with additional components (not shown, but known to persons of ordinary skill in the art), also controls scripting. The SHDOCVW component 218 performs operations related to the user interface. In addition, the SHDOCVW component 218 adds information about the origin of a Web page (i.e. their Internet address or URL) to the Web page, when it is saved from the Internet to a local storage medium. The JAVAVM component 220 performs operations related to Java applets. The URLMON component 221 generates the information about the origin of a saved Web page, and employs the information for security zone classification purposes. Each of these components communicates with an Internet security manager 222.

The Internet security manager 222 performs operations to determine the security zone corresponding to a Web server and to determine the permissible operations corresponding to a security zone. The Internet security manager passes security information to the MSHTML component 216, the SHDOCVW component 218, and the JAVAVM component 220, when requested. The Internet security manager 222 illustrated in FIG. 2 communicates with a system registry 224. The system registry 224 operates as a database of information pertaining to application programs that execute on the personal computer 20 (FIG. 1). Windows 95, available from Microsoft Corporation, of Redmond, Wash., provides a system registry that is employed by application programs to store configuration information for subsequent retrieval. A security configuration user interface component 226 within the browser 204 stores information pertaining to security in the system registry 224. In particular, the security configuration user interface component 226 stores information representing the security settings corresponding to each security zone and the distribution of Web sites among the security zones. As will be understood by those skilled in the art of computer programming and others, alternative mechanisms for storing and accessing the information may be used. For example, the information described as residing in the system registry 224 may alternatively reside in one or more data structures internal to the application or in files. A more detailed discussion of the security zones that can be used in conjunction with the present invention may be found in U.S. patent application Ser. No. 09/055,772, filed Apr. 6, 1998, entitled "Network Security Zones," which is incorporated herein by reference in its entirety as a whole. The above illustration of the Web browser 204 is merely a description of one particular implementation of a browser that can be used in conjunction with the present invention. A person of ordinary skill in the art will readily appreciate that other browser implementations could be used with the present invention.

Figure 3:
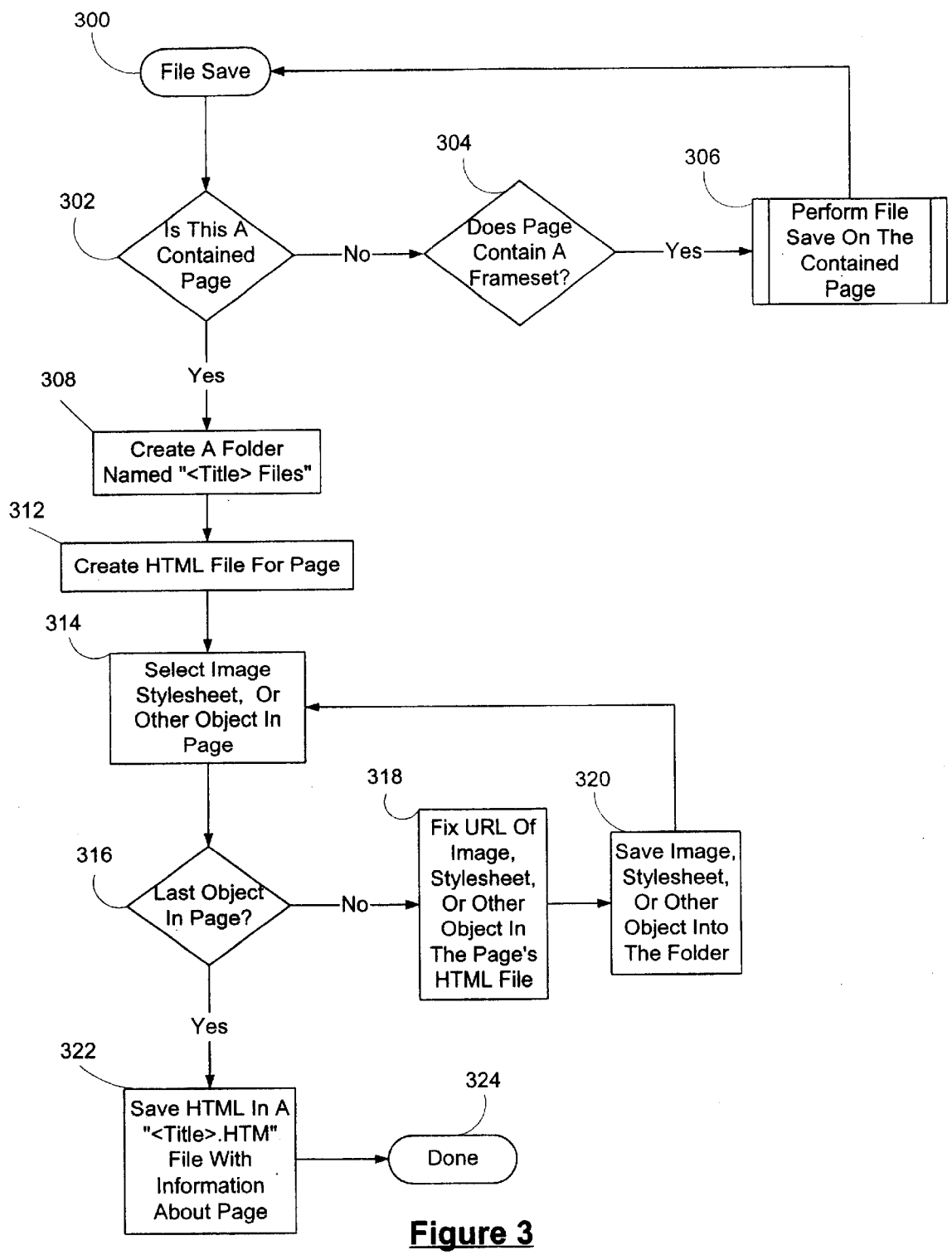
FIG. 3 is a flow diagram illustrating an exemplary process of storing information about a Web page on a local computer-readable medium when the Web page is downloaded from a Web site on the Internet.

FIG. 3 illustrates an exemplary process of storing information about a Web page on a local computer-readable medium, when the Web page is downloaded from a Web site on the Internet. This process enables the Web browser to utilize the stored information to re-establish the original security context of the Web page when the user loads the saved version of the page or frameset from his or her local storage. This system and method is preferably implemented in the form of a computer program that is distributed across to software components of a Web browser 204, and is activated both when a user saves a Web page as well as when a Web page is loaded from the user's local storage medium. For the purposes of the following detailed discussion, single Web pages/documents and frameset documents are identical.

The save process of the present invention is initiated at step 300 when a user selects File and then "Save As" on the menu bar of a Web browser 204, such as Microsoft Corporation's Internet Explorer. The Web browser 204 first determines whether the displayed Web page is contained in a frameset at step 302. If the Web page is not contained in a frameset at step 302, the Web browser 204 next determines whether the Web page contains a frameset at step 304. If the Web page is contained in a frameset at step 304, the Web browser 204 performs a file save on the contained page or contained pages at step 306. This step 306 of performing a file save can be written as a separate subroutine(s) or as a function call to the File Save routine at step 300.

If the Web page displayed by the Web browser 204 is a contained page at step 302, or if the Web page does not contain one or more framesets at step 304, then the Web browser 204 creates a folder on the local storage medium at step 308. As previously discussed, this local storage medium can be any type of computer-readable medium. In the one embodiment, the folder created by the Web browser 204 is named "<Title>_Files" at step 308, wherein <Title> denotes the title of the HTML Web page (i.e. not the filename of the HTML file). For example, consider a Web page entitled "Microsoft." Of course, any folder naming convention could be used with the present invention. If a user performs a File Save at step 300 on this Web page, the Web browser 204 will create a folder entitled "Microsoft_Files" at step 308.

After the folder is created at step 308, the Web browser 204 creates an HTML file for the Web page to be saved on the local storage medium at step 312. The Web browser 204 then proceeds to identify and select an image, stylesheet or other object in the Web page at step 314. In step 318, the Web browser 204 then modifies the image, stylesheet or object's URL in the HTML file to reflect the fact that the image, stylesheet or object is located on the local storage medium instead of its prior location of a Web server on the Internet. In step 320, the Web browser then saves the image, stylesheet or object into the folder created in step 308. The Web browser 204 then identifies and selects the next image, stylesheet or object at step 314, and the process is repeated.

If the Web browser 204 was unable to locate any images, stylesheets or other objects in the Web page at step 314, or if the Web browser 204 has already selected and saved all images, stylesheets and other objects in the Web page at step 314, the Web browser 204 then proceeds from step 316 to step 322. At step 322, the Web browser 204 inserts information regarding the Web page into the HTML file and saves the HTML file on the local computer-readable medium. The information inserted into the HTML file could be any information that helps establish a security context or otherwise identify security characteristics for the Web page. However, in the preferred embodiment, the information inserted into the HTML file is information regarding the origin of the Web page (i.e. the Internet address or URL for the Web page). The name of the HTML file created by the Web browser 204 is "<Title>.HTM," wherein <Title> denotes the title of the Web page. As noted above, any file naming convention could be used in the present invention. After the HTML file is saved at step 322, the process is complete at step 324.

An example of the beginning of the HTML text of a Web page before and after it has been saved using the process illustrated in FIG. 3 is shown below. For discussion purposes, let's refer to the HTML text of the Web page, before it is saved, as the "original Web page." Similarly, for purposes of the present disclosure the HTML text of the Web page, after it is saved, is referred to as the "saved Web page."

Before
<html>
<head>
<!--9/22/98 12:50:37 PM 17915 //-->
<meta HTTP-EQUIV="Content-Type" content="text/html; charset=iso-8859-1">
<meta http-equiv="PICS-Label" content='(PICS-1.1 "http://www.rsac.org/ratingsv01.html" 1 comment "RSACi North America Server" by "inet@microsoft.com" r (n 0 s 0 v 0 1 0))'>
<title>MSN.COM</title>
<script language="Javascript">

After
<!DOCTYPE HTML PUBLIC "-//W3C//DTD W3 HTML//EN">
<!-- saved from url=(0037)http://home.microsoft.com/Default.asp -->
<HTML><HEAD><TITLE>MSN.COM</TITLE><!--
9/22/98 12:50:35 PM 17613 //-->
<META content="text/html; charset=iso-8859-1" http-equiv=Content-Type>
<META content='(PICS-1.1 "http://www.rsac.org/ratingsv01.html" 1 comment "RSACi North America Server" by "inet@microsoft.com" r (n 0 s 0 v 0 1 0))' http-equiv=PICS-Label>
<SCRIPT language=Javascript>

As illustrated in FIG. 3 and discussed above, the SHDOCVW component 218 created the saved Web page and an OLE Istream on the saved Web page. The URLMON component 221 generated information about the original Web page. The SHDOCVW component 218 then inserted the information into the saved Web page. In this example, the information generated about the original Web page was its Internet address (i.e. URL) and can be found in line two of the saved Web page. The format for this information is <!-- saved from url=(# of characters in URL)URL -!>, wherein (# of characters in URL) is a parameter which is replaced with a number corresponding to the number of characters in the URL. Again, any format for the information can be used. Also, any type or quantity of information can be stored in the saved Web page, so long as the information helps the Web browser 204 re-establish the security context for the saved Web page. As shown in this example, an HTML comment may, if desired, be inserted at the beginning of the HTML text for the saved Web page. The SHDOCVW component 218 then writes the HTML text of the original Web page to the OLE Istream for the saved Web page. The resulting file (i.e. the saved Web page) is stored on the local storage medium and contains one or more HTML comments (if any), information to re-establish a security context for the saved Web page, and the HTML text of the original Web page. In the preferred embodiment, the information is an HTML comment; accordingly, the information does not alter the rendering of the saved Web page when viewed by the Web browser 204.

After the original Web page has been saved to the user's local storage medium, the user can then—at his or her convenience—view the Web page stored on his or her local storage medium. While viewing any saved Web page, various components of the Web browser 204 (including the base browser object in the SHDOCVW component 218 and the HTML rendering engine in the MSHTML component 216) consult with the Internet security manager 222 to identify information that can be used to re-establish a security context for the saved Web page. For example, if Web browser 204 opens a file with a URL in the form of file://C:<filename> (where C is any local drive letter), the Internet security manager 222 inspects the beginning of the file for information that can be used to re-establish a security context for the saved Web page. When this information is found, then the Internet security manager 222 uses the URL within the saved Web page to identify the security context for the Web page, instead of the file://C: URL which identifies the local storage location of the saved Web page. It is important to note that, for security purposes, only "more trusted" URL pages use the security identity information to put content into "less trusted" security zones. In other words, since the security identity information is within the content (and hence should not be trusted), the mechanism should only be applied to move the page to a less trusted zone rather than a more trusted zone/domain.

Using the above example, the saved Web page has, from the File Save process at step 300, stored with it information that can be used to re-establish a security context for the saved Web page. The Internet security manager 222 identifies the information on line two of the HTML text for the saved Web page. When the Web browser 204 asks the Internet security manager 222 for the security context for the saved Web page, the Internet security manager 222 will see the information on line two, and will respond with "http://home.microsoft.com/Default.asp," instead of "file://C:\Win95\Desktop\microsoft.htm."

Thus, using the system and method of the present invention, saved Web pages and/or HTML framesets contained therein are only allowed to run active content scripting such as JavaScript and VBScript, software controls such as Java or ActiveX® controls, and cross-frame scripting in between the HTML framesets, if the scripting or controls were permitted in the Web page's original security context. In sum, the system and method of the present invention preserves the security protections enjoyed by the user for the online version of the Web page even when the user is viewing and executing the locally saved copy of the Web page.

The present invention has been described in the foregoing specification with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings arc, therefore, to be regarded in an illustrative rather than restrictive sense. Accordingly, it is not intended that the invention be limited except as may be necessary in view of the appended claims.

What is claimed is:

1. A computer-readable medium having computer-executable components comprising:
   a storage component for storing information related to an electronic document when the electronic document is saved to the computer-readable medium; and
   a security component that uses the stored information to facilitate secure viewing or execution of the electronic document.

2. The computer-readable medium of claim 1 wherein the storage component stores the information from an Internet to the computer-readable medium.

3. The computer-readable medium of claim 1 wherein the electronic document is a Web page.

4. The computer-readable medium of claim 3 wherein the stored information is an address of the Web page.

5. The computer-readable medium of claim 4 wherein the security component uses the address to identify a security context for the Web page.

6. The computer-readable medium of claim 4 wherein the address is stored within the Web page saved on the computer-readable medium.

7. A computer-readable medium having computer-executable instructions for performing steps comprising:
   storing an original address of a Web page, when the Web page is saved onto the computer-readable medium; and
   using the original address to identify a security context for the Web page, when the Web page is opened from the computer-readable medium.

8. A computer-readable medium having computer-executable instructions for performing steps comprising:
   downloading a Web page from an Internet to the computer-readable medium, said Web page having an Internet address;
   storing the Internet address on the computer-readable medium; and
   using the Internet address to identify a security context for the Web page, when the Web page is opened from the computer-readable medium.

9. The computer-readable medium of claim 8 wherein the Internet address is stored with the Web page on the computer-readable medium.

10. The computer-readable medium of claim 8 wherein the Internet address is inserted into the Web page on the computer-readable medium.

11. A method of saving a Web page from a Web site on an Internet to a computer-readable medium, said Web page containing at least one component having an URL, said method comprising the steps of:
    creating a folder on the computer-readable medium;
    modifying the URL in the Web page for said at least one component in order to identify said component as being stored on the computer-readable medium;
    storing said at least one component in the folder; and
    inserting information in the Web page to identify the Web site on the Internet from which the Web page was saved.

12. The method of claim 11 wherein said information is an Internet address.

13. The method of claim 11 wherein said at least one component is a stylesheet, image or object.

14. The method of claim 11 further comprising the step of determining whether the Web page contains at least one frameset.

15. The computer security system comprising:
    means for storing Internet address information related to an electronic document when the electronic document is saved to a computer-readable medium; and
    means for using the stored Internet address information to facilitate secure viewing or execution of the electronic document.

16. A method of saving a Web page from a Web site on an Internet to a computer-readable medium, said Web page having an original address, said method comprising the steps of:
    storing the original address of the Web page, when the Web page is saved onto the computer-readable medium; and
    using the original address to identify a security context for the Web page, when the Web page is opened from the computer-readable medium.

* * * * *